Dec. 23, 1947.  G. H. LEEF  2,433,131
CONVEYING SYSTEM AND CONVEYOR THEREFOR
Filed April 5, 1944  3 Sheets-Sheet 1

INVENTOR.
GEORGE H. LEEF
BY John W. Michael
ATTORNEY.

Dec. 23, 1947. G. H. LEEF 2,433,131
CONVEYING SYSTEM AND CONVEYOR THEREFOR
Filed April 5, 1944 3 Sheets-Sheet 2

INVENTOR.
GEORGE H. LEEF
BY John W. Michael
ATTORNEY.

Dec. 23, 1947.  G. H. LEEF  2,433,131
CONVEYING SYSTEM AND CONVEYOR THEREFOR
Filed April 5, 1944  3 Sheets-Sheet 3
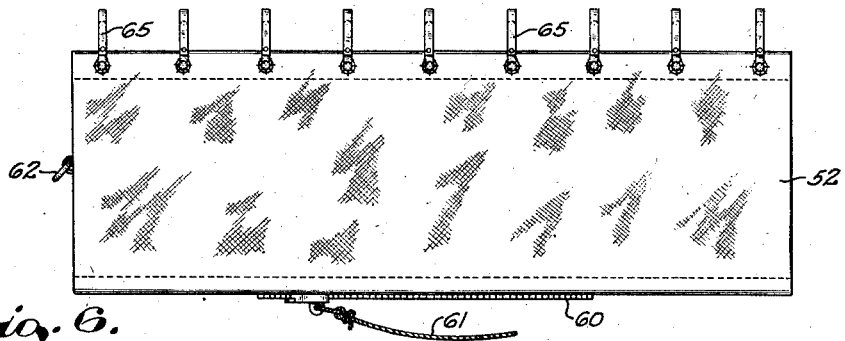
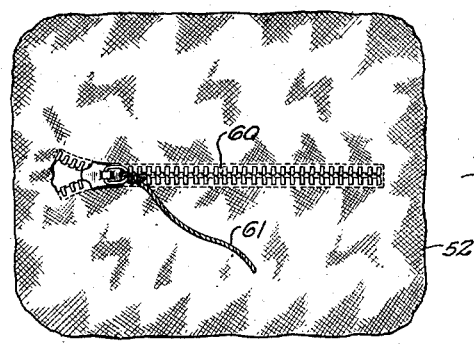
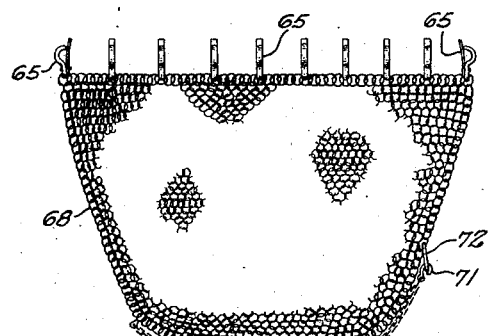
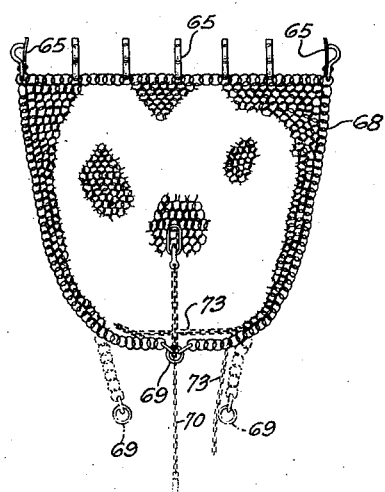
INVENTOR.
GEORGE H. LEEF
BY John W. Michael
ATTORNEY.

Patented Dec. 23, 1947

2,433,131

UNITED STATES PATENT OFFICE 2,433,131

CONVEYING SYSTEM AND CONVEYOR THEREFOR

George H. Leef, Milwaukee, Wis.

Application April 5, 1944, Serial No. 529,625

4 Claims. (Cl. 214—86)

This invention relates to improvements in conveying systems and in the conveyors used therewith.

It is one object of the invention to provide a conveying system of the suspended carrier or conveyor type in which the material carriers are readily removable as a unit from the conveyor for loading and for return to the conveying system when loaded.

Another object of the invention is to provide a conveying system in which the material carriers are loaded, propelled along the conveying track, and dumped from the floor level.

Another object of the invention is to provide a conveying system in which the structure of the entire system, and particularly that of the material carriers, is simple and cheap but highly effective, which is readily adapted to the conveying of various products in mass, and in which the carriers comprise only two major portions which can be readily disassembled and reassembled by unskilled persons.

Another object of the invention is to provide a carrier for a conveying system of the suspended carrying type in which the carrier may be loaded from the top without regard to the balancing of the load and may be dumped through a readily closable opening in a wall of the carrier.

Another object of the invention is to provide a carrier for a conveying system of the suspended carrier type in which the carrier comprises only two major portions which are readily maintained by unskilled labor.

Objects and advantages other than those above set forth will be apparent from the following description when read in connection with the accompanying drawings, in which:

Fig. 6 is a side elevation, in the nature of a development, of the bag-like portion of the carrier showing modified means for securing the bag portion to the frame of the carrier and for closing the dumping opening in the bag;

Fig. 7 is a bottom view more clearly showing the bag opening closure of Fig. 6;

Fig. 8 is a side elevation showing the bag-like portion of the carrier made of chain mesh; and Fig. 9 is an end view of the modified carrier shown in Fig. 8 and with some portions thereof indicated in dotted line in the dumping position.

Figure 1:
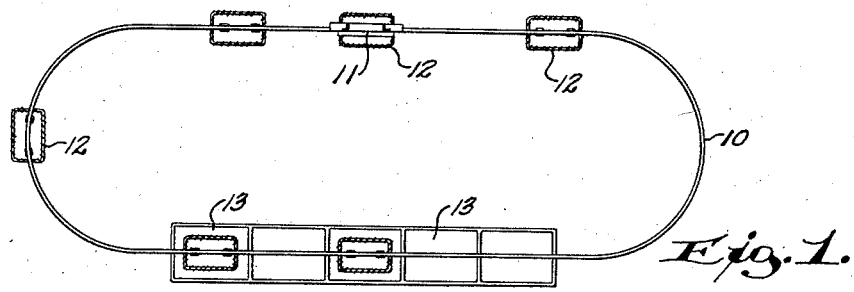
Fig. 1 is a diagrammatic view in top plan of a conveyor system according to the present invention.

Referring to the drawings by reference numerals, the reference numeral 10 designates a carrying track which is herein shown as being the rail of a monorail conveying system, and numeral 11 designates the elevator by which carriers 12 are lifted from floor level to the level of the rail 10. The conveying system is adapted to permit transport of materials in the carriers 12 to delivery or discharge points or locations 13 which may be bins, tote boxes, truck bodies, or the like.

The carrying rail or track 10 is suitably supported and is herein indicated as being a monorail suspended by means of hangers 17 from the ceiling or framing of a building or other suitable supporting frame 18. A section 20 of the rail 10 is mounted in an elevator which generally comprises a frame portion 21 mounted on suitable guides 22 and which may be raised and lowered by means of a cable 23 wound and unwound on a drum driven from a suitable power source (not shown). A plurality of trolleys, generally designated 26, are mounted on the carrying rail 10. The trolleys are preferably independent and severally consist only of a pair of wheels 27 on an axle, a clevis 28 suspended from the wheels, and a hook 29 suspended from the clevis. The carriers 12 are so constructed as to be severally suspensible from a pair of trolleys 26 and to be readily removable therefrom.

Figure 2:
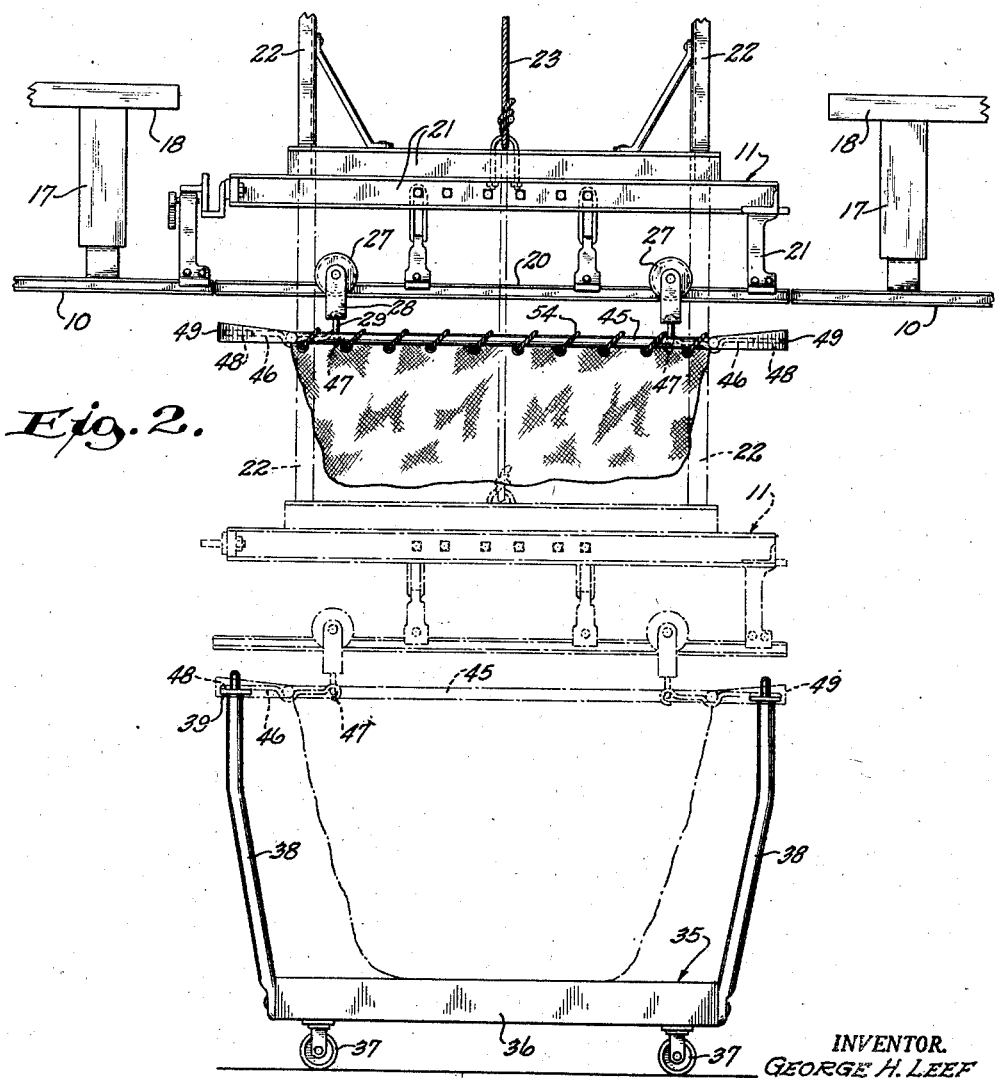
Fig. 2 is a fragmentary view of portions of the conveyor system including the carrier, the loading truck for the carrier, and the elevator for lifting the carrier to the level of the conveying rail.
Figure 3:
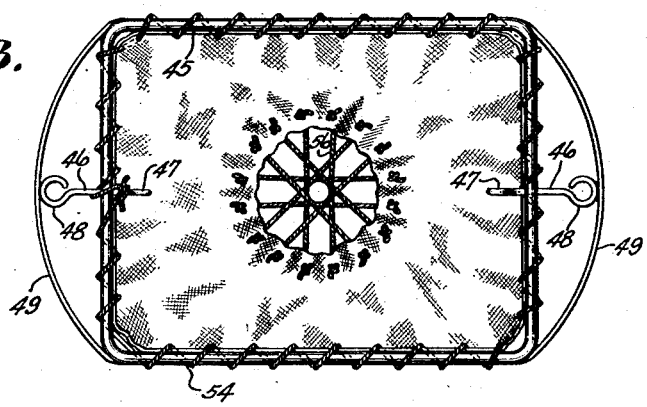
Fig. 3 is a top plan view of the carrier.

As shown in Figure 2, the elevator 11 brings a carrier 12 down to adjacent the floor level at which point the carrier is mounted in a loading truck 35 for movement to any collection point or points at which material is to be loaded into the carrier which may then be moved beneath the elevator for lifting to the level of the carrying track 10. The loading truck includes a relatively small base 36 mounted on swiveling wheels 37 and with standards or posts 38 extending upwardly from the base and having flanges or shoulders 39 on which the carriers are suspended while on the truck. The truck base 36 is preferably of such size that the truck mounted carrier can be brought closely to the discharge port or chute of a machine for direct loading into the carrier. Suspending the carrier from the two posts 38 on the truck automatically keeps the load balanced and further prevents dropping material on the floor during the loading process.

Figure 4:
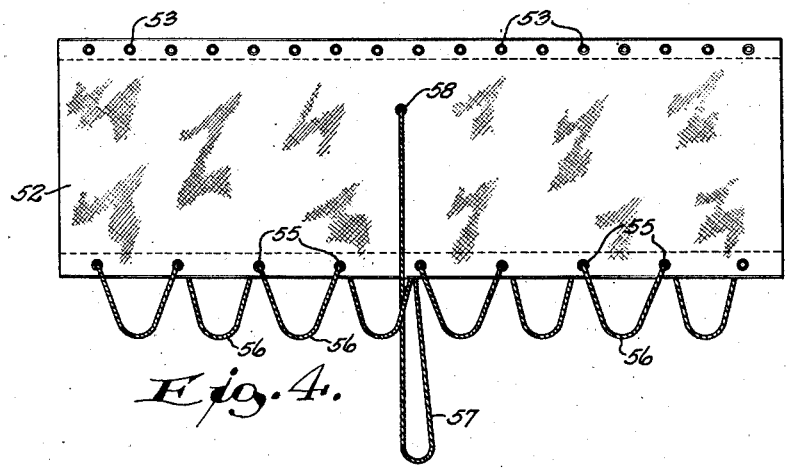
Fig. 4 is a side view, in the nature of a development, of the bag-like portion of the carrier.
Figure 5:
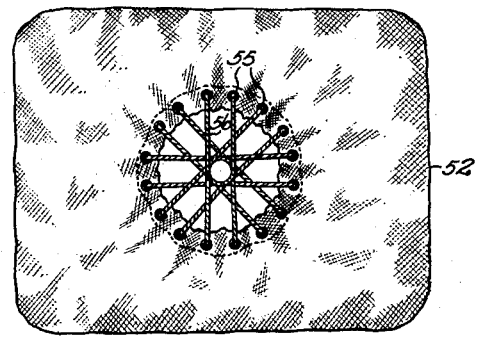
Fig. 5 is a bottom view of the bag-like portion of the carrier.

The carrier itself includes an endless frame 45 which is preferably of relatively light but rigid tubular material and is preferably substantially rectangular in shape. At the ends of the frame 45, and extending inwardly and outwardly therefrom on the longitudinal axis of the frame, there are mounted bars 46 having eyes 47 and 48 formed in the ends thereof. The eyes 47 lie in a vertical plane and are adapted to receive the trolley hooks 29, and the eyes 48 extend in a horizontal plane and are so located as to rest on the post flanges 39 of the loading truck whereby the carrier is retained in the proper position for loading and for attachment, when loaded, to the trolleys of the conveying system. Arcuate shaped pusher plates 49 are secured to the corners of the frame 45 and extend therefrom and are joined to the eyes 48 for a purpose which will appear hereinafter. The carrier is formed with a bag-like portion shown in the present structure as being an endless band 52 of textile or chain mesh material. The bag, if made of textile material, as shown in Fig. 4, is provided about one edge of the band with a number of grommets 53 through which a rope 54 may be threaded for lashing the bag 52 to the carrier frame 45, the number of grommets being sufficient so that the bag top may be held closely to the frame. A plurality of pairs of grommets 55 are also inserted in the other edge of the band and each such pair of grommets forms means for attaching a rope loop 56 to the bag. When one edge of the bag-band 52 is secured to the frame 45, and the frame is suspended from the trolleys 26 or from the posts 38 of the loading truck, the open bottom of the bag may be substantially closed by interconnecting all of the rope loops 56 by means of a tie rope 57 attached at its ends to the lower edge of the bag and to a point, as at 58, on the side wall of the bag. The construction described immediately above has been proven to be particularly satisfactory in practice for the conveying of textile materials, which are sufficiently interlaced and intermingled to prevent even small pieces of material from falling through the spaces between the several rope loops 56.

If the carrier 12 is to be used for transporting granular materials, such as grain, sawdust, and the like, the bag 52 may again be made of suitable textile material, but it is then desirable that the dumping openings in the carriers be closed by closure means, such as the slide fastener 60 shown, which will provide a sufficiently tight closure to prevent loss of the granular material being conveyed. A rope 61 may also be used as a tie for positively holding the slide fastener closed and the rope may be fastened by a quickly detachable knot to a ring 62 so placed on the bag 52 that the filled bag exerts a strain on the rope and holds the rope taut, thus keeping the slide fastener in tightly closed position. The modified form of the invention above described also discloses the use of snap fasteners 65 of a suitable type secured about the upper opening of the bag and providing means for readily attaching the bag to and detaching the bag from the frame.

If the conveyor is to be used for transporting metallic parts or materials which are abrasive to textiles, the bag is preferably made of chain mesh, as indicated in Figs. 8 and 9 at 68, and is more nearly bag-like with an opening in the bottom thereof. It is then desirable that the edges of the dumping opening of the chain mesh bag 68 be provided with a closure means which will be at least of durability equal to that of the chain mesh. Such closure means may include rings 69 attached to the edges of the bag about the bottom opening and in substantially opposite relation, and the rings may be drawn adjacent each other and held together by a chain 70 extending through the rings. The chain 70 is preferably permanently attached at one end to the bag 68 and is provided at the other end thereof with a hook 71 for engaging in a ring 72 mounted on the end of the bag. The hook 71 and ring 72 may be replaced by various other fastening means which are readily detachable when the carrier is loaded. If the metallic or abrasive materials to be transported in the carrier are of such size that the ring and chain closure will not prevent loss from the carrier, a flap 73 of chain mesh material may be secured at one edge to the inner surface of the bag in such position that the flap may be laid over any openings remaining in the bottom of the carrier when the chain 70 is threaded through the rings 69 for closing the bag bottom opening.

In use of the carrier disclosed, it has been found that the present conveying system and its special carriers facilitate the handling of material by unskilled labor in a minimum of space, with the least possible effort and in such manner as to avoid safety hazards. The carriers receive the material such as laundry by direct discharge thereinto from machines such as driers with no intermediate handling whatever and without any regard for the manner in which the material is loaded into the carriers. The carriers are immediately transferred to the overhead track, thus keeping the floor space clear which avoids shifting baskets, which were formerly used, to secure access to a particular basket or to a machine or part thereof. Keeping the floor space completely clear increases the safety of work adjacent to machines, particularly in that it makes the controls for the machines readily accessible. The immediate transfer of loaded carriers to overhead trackage utilizes the overhead space for storage until the carriers can be dumped into bins or other delivery locations. The bins can be built to a height just clearing the loaded carriers, thus providing increased bin capacity in a vertical direction which further conserves the floor space. The only manual effort required for moving the loaded material is that necessary for moving the truck from a machine such as a drier to the conveyor elevator, and the pull or push required to move the carriers along the rail. The carriers are readily propelled from one location on the track to another merely by pulling on the several strands of the tie rope, the preceding carriers being pushed by contact between the push plates with no interference between the carriers even around track curves of short radius. Dumping of individual carriers is accomplished from floor level merely by pulling on the proper strand of the tie rope to release a slip knot by which the rope loops are held together to form a closure for the bottom opening in the carrier bag. There is no manual lifting of the material which heretofore limited the bins to the height to which a person could lift a quantity of the material. The manual effort expended is accordingly reduced to a minimum and is exerted from the floor which is now wholly clear, thereby improving the safety conditions under which the work is performed. Production is enhanced by the increase in usable working space, by reduction in the manual effort needed to convey the material, and because of the safer and pleasanter working conditions. A greater volume of work can be handled in the same space with the addition only of more trackage and carriers. When the bag portion of a carrier becomes soiled, or requires repair, it is readily removed from the frame for laundrying and repair by unskilled persons, thus simplifying maintenance of the carriers in suitable condition.

The carrier structure itself is so simple and cheap that the carriers are easily kept in any desired state of repair under any use to which they may be put.

Although but a few embodiments of the present invention have been illustrated and described, it will be apparent to those skilled in the art that various changes and modifications may be made therein without departing from the spirit of the invention or from the scope of the appended claims.

I claim:

1. In a carrier for a conveyor system, a rigid frame, a bag-like portion retained on the frame and having a plurality of openings in the wall thereof, means for closing one of the openings to such a degree as to avoid loss therethrough of the material being conveyed, the closing means being releasable when the carrier is filled, and pusher plates mounted on the frame and extending beyond the wall of the bag portion when the carrier is loaded.

2. In a carrier for a conveyor system, an endless frame of rigid material, a bag-like portion of flexible material continuously suspended from the frame and having openings therein, the one opening of the bag portion being held extended by the frame, a closure for the other bag opening whereby material is retained in the carrier and is released therefrom upon release of the closure, and pusher plates extending from the ends of the frame and in substantially the plane thereof and beyond the outer limits of the carrier when loaded.

3. In a carrier for a conveyor system, a rigid frame, an endless band of flexible material suspended at all times at one edge thereof from the frame to provide a continuously open loading opening, the other edge of the band defining a dumping opening, means closing the dumping opening against loss of material being conveyed, the means being releasable when the carrier is filled, and a substantially semi-circular plate extending from each of the several ends of the frame and beyond the flexible band when filled, the plates transmitting forces between carriers without contact of the flexible band portions thereof.

4. In a carrier for a conveyor system, an endless frame of rigid material, a bag-like portion of textile material open at both ends thereof, the one end of the bag portion being lashed to the frame and continuously distended thereby, rope loops extending from the bag portion about the opening in the end forming the bottom thereof when suspended from the frame, quickly detachable means holding the loops in interconnected relation to close the bottom opening of the bag, and pusher plates extending from the ends of the frame and in substantially the plane thereof and beyond the outer limits of the carrier when loaded.

GEORGE H. LEEF.

REFERENCES CITED

The following references are of record in the file of this patent:

UNITED STATES PATENTS

| Number | Name | Date |
| --- | --- | --- |
| 188,153 | Larkin | Mar. 6, 1877 |
| 692,405 | Wright | Feb. 4, 1902 |
| 821,177 | Leue | May 22, 1906 |
| 1,146,605 | Whitfield | July 13, 1915 |
| 1,150,003 | Focardi | Aug. 10, 1915 |
| 1,559,988 | Ryan | Nov. 3, 1925 |
| 1,649,065 | Jarvis et al. | Nov. 15, 1927 |
| 1,862,384 | Millar | June 7, 1932 |
| 2,035,355 | Weise | Mar. 24, 1936 |
| 2,035,359 | Anjeskey | Mar. 24, 1936 |
| 2,321,005 | Britain | June 8, 1943 |

FOREIGN PATENTS

| Number | Country | Date |
| --- | --- | --- |
| 478,530 | Great Britain | Jan. 20, 1938 |
| 384,811 | Great Britain | Dec. 15, 1932 |